Patented Apr. 20, 1937

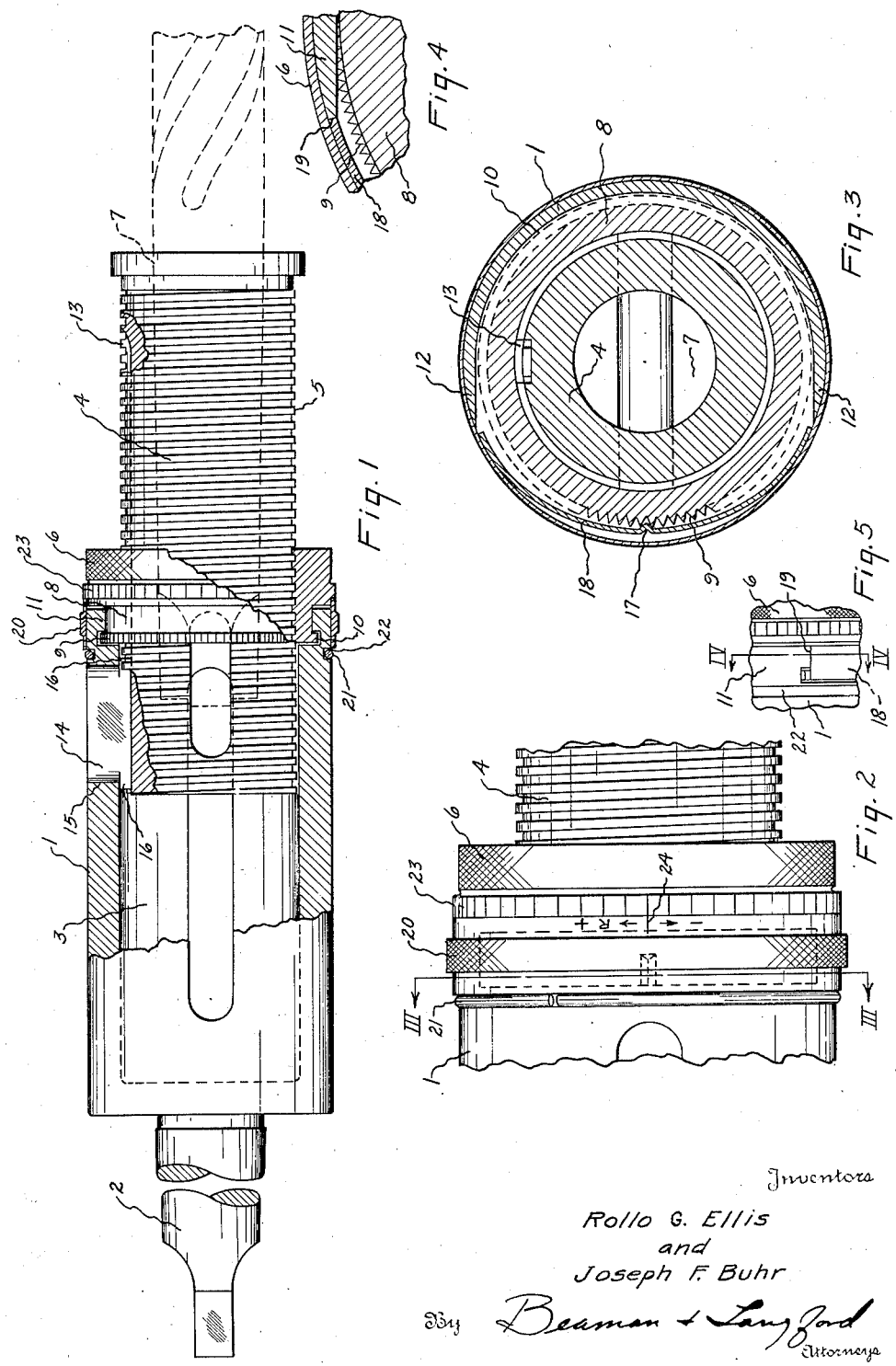

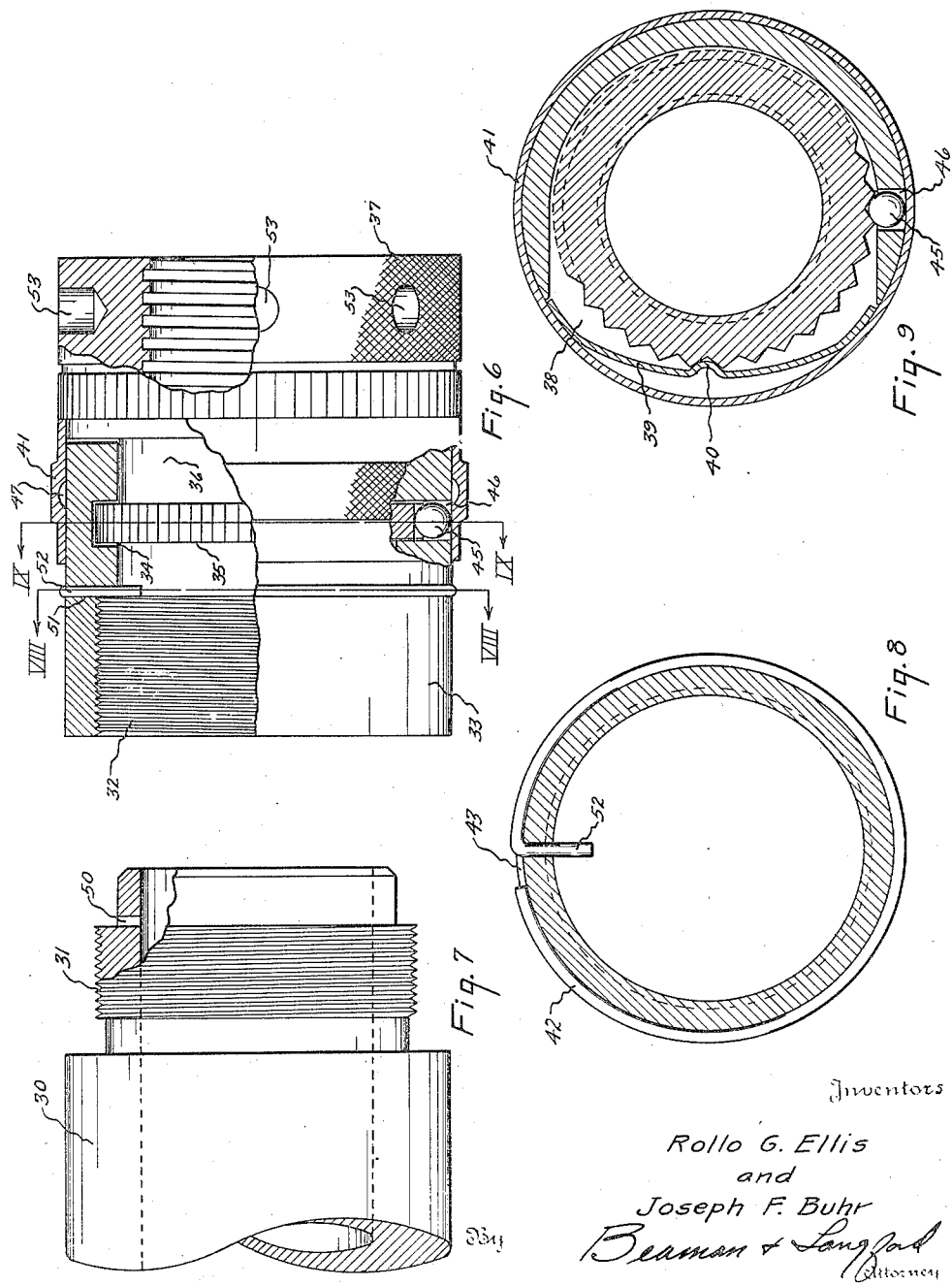

2,078,192

UNITED STATES PATENT OFFICE 2,078,192

TOOL HOLDER

Joseph F. Buhr and Rollo G. Ellis, Ann Arbor, Mich., assignors to Buhr Machine Tool Company, Ann Arbor, Mich.

Application May 24, 1935, Serial No. 23,234

12 Claims. (Cl. 279—9)

This invention relates to adjusting mechanism and more particularly to devices for adjusting the length of any bar-like member.

The invention may be applied wherever longitudinal adjustment is required, such as in the case of tool holders, valve tappets and the like. For the sake of simplicity the invention is described as applied to a tool holder, but it is to be understood that it may find application in many other uses.

In the case of multiple spindle drill presses, for example, relative axial adjustability of the tools is desired to regulate the cutting depth thereof. Certain types of adjustable tool holders include yieldable members or springs in their assembly to avoid precision operation in machining. These yieldable members, however, destroy the rigidity of the assembly and as a result in many instances have been discarded and a rigid spacing member substituted. While other types of adjustable tool holders in use do not employ yieldable members in their assembly, for the most part, however, these holders are not capable of micro-adjustment, nor are they capable of being inexpensively machined and assembled into a rigid unit.

An object of this invention is to overcome the above disadvantages by providing a micro-adjustable adjustment structure assembled without the use of axially stressed springs or other yieldable members.

A further object of this invention is to provide a micro-adjustable adjustment structure in which the body and the rotatable adjusting ring are assembled together by relative movement perpendicular to their axes.

Another object of this invention is to provide a micro-adjustable adjustment structure having a lock for positively securing it in adjusted position.

Another object of this invention is to provide a micro-adjustable adjustment structure which is constructed of few parts and may be readily assembled with a minimum expenditure of time.

These and other objects will be apparent from the following specification when taken with the accompanying drawings in which Fig. 1 is an elevation of the tool holder having parts broken away to show portions of a vertical section, Fig. 2 is an enlarged section showing the exterior of the specific tool adjusting elements of the invention, Fig. 3 is a section on the line III—III of Fig. 2, Fig. 4 is a section taken on the line IV—IV of Fig. 5, Fig. 5 shows a detail of the construction, Fig. 6 is a side elevation partially broken away, showing an embodiment of my invention, Fig. 7 is a specially formed spindle nose or body for receiving the embodiment of my invention illustrated in Fig. 6, Fig. 8 is a section taken on the line VIII—VIII of Fig. 6, and Fig. 9 is a section taken on the line IX—IX of Fig. 6.

Referring to Fig. 1 of the drawings, the body 1 has secured thereto a tapered shank 2. The body 1 is provided with a smooth concentric internal bore 3 extending substantially the entire length thereof and is arranged to receive therein the axial adjustable tool receiving socket 4. The socket 4 on the outside is provided with threads 5 throughout its length engageable with the internally threaded knurled adjusting ring 6 which, upon appropriate rotation, axially moves the socket 4 into and out of the bore 3. The threads 5 are preferably square or flat topped to provide a bearing surface for contact with the bore 3. The socket 4 is also provided with a concentric tapered bore 7 for receiving the tapered shank of a tool, a collet, a chuck or the like. A sleeve 8 extends from the knurled adjusting ring 6 and has disposed at its end a laterally extending toothed flange 9 normally disposed in the radially extending groove 10 in the body 1. The body 1 at its open end is radially cut back and with the groove 10 forms an inwardly extending flange 11 which acts as a bearing for receiving the sleeve 8 and in which the knurled adjusting ring 6 may be rotated.

In order to assemble the knurled adjusting ring 6 in the body 1 substantially one-half of one side of the inwardly extending flange 11 and of the portion of the body 1 radially opposite the groove 10 is cut away to permit relative movement of the adjusting ring 6 and the body 1 perpendicular to their axes to dispose the toothed flange 9 in the radially extending groove 10. For the purpose of illustration the elements of the construction are shown clearly spaced from each other. However in actual production the fit of the knurled adjusting ring 6 in the body 1 is made so that there is practically no relative movement between the ring 6 and the body 1 in either an axial or lateral direction except laterally as permitted by the cut away portion of the inwardly extending flange 11 and the adjacent portion of the body 1. Also the socket 4 snugly slides in the body 1. As shown particularly in Fig. 3 the space left by the portion cut away defines with the body substantially parallel tangential guides 12 for receiving the adjusting ring 6.

It will be evident that when the socket 4, the adjusting ring 6 and the body 1 are in assembled relation shown in Fig. 1 adjusting ring 6 will be maintained against movement out of the cut away portion of the body 1 by the socket 4 and the rotation thereof when the socket 4 is maintained against rotation will result in axial movement of the socket 4. In order to maintain the socket 4 against rotation the same is provided with a key way 13 extending along the surface thereof parallel to its axis. Cooperating with the key way 13 and preventing rotation of the socket 4 is a key 14 fitted in the slot 15 in the body 1. The key 14 is provided with axially extending enlarged portions 16 which are disposed in the slot 13 and underlie the body 1 preventing the key 14 from escaping outwardly.

Cooperating with the toothed flange 9 is a detent 17 to provide a ratchet mechanism for maintaining the adjusting ring 6 in adjusted position. The detent 17 is crimped in the resilient strip 18 which is disposed in the space provided by the portion cut away to permit the assembling of the adjusting ring 6 in the body 1. As shown particularly in Fig. 4 the resilient strip 18 bears at its ends against, and is maintained against circumferential movement, by the shoulders 19 on the ends of the inwardly extending flange 11. The resilient strip 18 with its detent 17 is maintained in assembled position by the sleeve 20 axially slidable on the surface of the body 1. The sleeve 20 is maintained against the adjusting ring 6 by the split resilient ring 21 disposed in the annular groove 22. The sleeve 20 further functions to maintain the adjusting ring 6 in assembled position upon removal of the socket 4. Upon the removal of the split ring 21 the sleeve 20 may be slipped axially along the surface of the body 1 to release the resilient detent strip 18 and to permit the disassembling of the adjusting ring 6 from the body 1.

In order to facilitate the operation of the holder, the adjusting ring 6 is provided with graduations 23 impressed in a suitable manner in its surface. These graduations cooperate with a zero graduation 24 on the retaining sleeve 20. Thus, upon rotation of the adjusting ring 6 to axially adjust the socket 4, by counting the graduations 23 passing the zero graduation 24, the amount of axial adjustment of the socket 4 may be determined. The operation of the tool holder may be further facilitated, before axially adjusting the socket 4, by rotating the sleeve 20 including its zero graduation 24 until the zero graduation 24 is in alignment with an appropriate graduation 23 on the adjusting ring 6. It will thus be evident that any adjustment may be made to begin from "zero".

Figs. 6, 7, 8, and 9 illustrate an embodiment of the invention. According to the embodiment, the body 30, as shown in Fig. 7, having a tapered shank, not shown, corresponds to the body 1 of Fig. 1. However, it is turned down and provided with threads 31 for receiving the adjusting mechanism, shown in Fig. 6, and the tool receiving socket 4, not shown in Fig. 6. The adjusting mechanism of Fig. 6 is provided with internal threads 32 for engagement with the external threads 31 on the body 30. According to this modified form of the invention, the body 30 may be standard equipment to which adjusting devices of various specifications may be threaded.

Also if it is desired to transfer the adjusting device from one machine to another, or if the tang of the body twists off the body, the body and the adjusting device may be readily separated.

Another feature of the invention as disclosed in the embodiment is the lock for preventing the accidental disturbing of adjustment such as sometimes occurs when large chips from a heavy cut twist against the knurled adjusting ring of Fig. 1. Referring to Fig. 6, the removable body 33 is provided with an internal radially extending groove 34, into which extends the toothed radial flange 35 mounted on the sleeve 36, comprising a portion of the knurled adjusting ring 37. As in the embodiment illustrating Figs. 1 through 5, the body 33 is cut out at 38 to permit the entrance of the toothed flange 35 into the internal radially extending groove 34. As in the first embodiment, a leaf spring 39 having a detent 40 is maintained in resilient contact with the toothed flange 35 by the sleeve 41 to provide a ratchet, and to retain the toothed flange 35 in the internal radially extending groove 34. A resilient retaining ring 42 disposed in a groove 43 prevents the sleeve 41 from sliding away from its position over the spring 39.

Thus far the construction described is substantially the same as that disclosed in the first embodiment. In the present embodiment an adjusted position retaining lock is provided. The lock comprises a steel ball 45 disposed in a bore 46 in the body 33, radially opposite the toothed flange 35. When the sleeve 41 is in the position shown in Fig. 6, the steel ball 45 is positively held in a depression defined by two adjacent teeth in the toothed flange 35.

In order to remove the ball 45 from its locking position, the sleeve 41 is slidably moved over the body 33 until the internal annular groove 47 in the ring 40 is positioned radially opposite the ball 45. The ball may then be cammed outwardly by rotating the knurled adjusting ring 37. From inspection of Figs. 6 and 9, it will be obvious that the position of the bore 46 may be oposite substantially any portion of the toothed flange receiving groove 34, with the exception that it must be so related to the position of the detent 40 that both the ball 45 and the detent 40 will be disposed within a depression formed by two adjacent teeth in the toothed flange 35 at the same time. The annular groove 47 must also be of sufficient depth to permit the ball to move outwardly far enough to clear the teeth of the toothed flange 40 when the same is rotated.

An additional feature of the present embodiment resides in the pin for pinning the removable body 33 to the body 30. A radially extending bore 50 is drilled in the portion of the body 30, adjacent the threads 31, and a bore 51 is drilled in the removable body 33 so positioned that when the removable body 33 is screwed tightly to the body 30, the two bores will be in axial alignment. In practice the bores 50 and 51 preferably are made in a single operation while the removable body 33 is assembled on the body 30. These bores are also in alignment with the annular groove 43 receiving the resilient retaining ring 42. A pin 52 is formed on the end of the spring ring 42 so that when the spring ring 42 is in position, the pin 52 is inserted in the axially aligned bores 50 and 51 to pin the removable body 33 and the body 30 against relative rotation. Convenient bores 53 are provided in the knurled adjusting ring 38 for receiving a suitable wrench.

It will be apparent from the foregoing specification that the invention is not limited to tool holders, but may be used wherever a longitudinal adjustment is required. Further, as applied to tool holders, the body disclosed in Fig. 6 may be attached directly to any suitable structure and not necessarily to a tapered shank portion as described.

Having thus described our invention, what we desire to secure by Letters Patent and claim is:

1. A device of the type described comprising a body, a member axially adjustable therein, a rotatable adjusting ring to axially adjust said member relative to said body, an annular flange having teeth around the periphery thereof secured to said adjusting ring and engageable with said body to maintain said adjusting ring against axial movement relative to said body, means defined by said body to provide for, when said member is out of engagement with said body, relative movement between said adjusting ring and said body in a direction substantially perpendicular to their axes to assemble the same, and means engageable with said toothed flange providing a ratchet and maintaining said adjusting ring in adjusted position.

2. A device of the type described comprising a body, a member axially adjustable therein, means secured to said body and maintained against axial movement relative thereto for axially adjusting said member, a slot defined by said body to provide for, under certain conditions, relative movement between said adjusting means and said body in a direction substantially perpendicular to their axes to assemble the same, and a retaining band operable to prevent in one position thereof relative movement between said adjusting means and said body in its assembling direction.

3. A connection between two members, comprising a rotatable adjusting ring, a flange on and concentric with said adjusting ring, a shoulder in one of said members, means defined by said last named member to permit relative lateral movement between said ring and said first named member for disposing said flange behind said shoulder for preventing longitudinal movement of said ring relative to said last named member, and slidable means to lock said ring and said last named member against lateral movement, the other of said members being connected to said ring.

4. A connection between two members, comprising means movable relatively laterally into locking engagement with one of said members, a threaded connection between said means and the other of said members for longitudinal adjustment of said two members by said means, and ratchet mechanism associated with said means and said first named member for maintaining said second named member in adjusted position, a portion of said ratchet mechanism being arranged to maintain said first named member in locked engagement.

5. A device of the type described, comprising a body, supporting means axially adjustable therein, a rotatable adjusting ring to axially adjust said supporting means, a toothed flange concentric with said adjusting ring engageable with said body to maintain said adjusting ring against movement relative to said body, a slot defined by said body to provide for sidewise assembly for said adjusting ring, means defining a detent engageable with said toothed flange providing a ratchet mechanism for maintaining said adjusting ring in adjusted position, and means preventing relative movement between said adjusting means and said body in disassembling direction and retaining said ring defining said detent in assembled position.

6. A device of the type described, comprising a body, supporting means axially adjustable therein, a shoulder in said body, means including a shoulder for engagement with the shoulder in said body to secure said last named means to said body, to axially adjust said supporting means relative to said body, means defined by said body to provide for, under certain conditions, relative movement between said adjusting means and said body in a direction parallel to the surfaces of said shoulders for assembling said shoulders into securing engagement, and means including an encircling band to maintain said adjusting means and body in assembled relation.

7. A device of the type described, comprising a body, supporting means mounted in said body, a rotatable adjusting ring to axially adjust said supporting means relatively to said body, an annular toothed flange fixed to and rotatable with said adjusting ring and disposed in said body, a bore extending from the exterior of said body to said toothed flange, a freely movable body disposed in said bore, and means slidable on said body into superimposed relationship with said bore and movable body therein to hold said movable body against the surface of said toothed flange, and a groove in said slidable holding means for disposition over said bore by further sliding thereof to permit said body to rise sufficiently to be disengaged from said toothed flange.

8. A device of the type described, comprising a body, a member mounted in said body, a rotatable adjusting ring to axially adjust said member relatively to said body, an annular toothed flange fixed to and rotatable with said adjusting ring, and means engageable with said toothed flange to positively lock said adjusting ring in adjusted position.

9. A device of the type described, comprising a body, supporting means mounted in said body, a rotatable adjusting ring to axially adjust said supporting means relatively to said body, a toothed flange secured to said adjusting ring and engaging with said body to maintain said adjusting ring against axial movement relative to said body, a slot defined by said body to provide for relative movement between said adjusting ring and said body in a direction substantially perpendicular to their axes to assemble the same, a resiliently mounted detent associated with said toothed flange to provide a ratchet for maintaining said adjusting ring in adjusted position, and a second detent engageable with said toothed flange for positively locking said adjusting ring in adjusted position.

10. A device of the type described, comprising a body, supporting means axially adjustable therein, means secured to said body to axially adjust said supporting means relative to said body, a slot defined by said body to provide for relative movement, under certain conditions, between said adjusting means and said body to assemble the same, ratchet mechanism associated with said adjusting means to yieldingly maintain said adjusting means in adjusted position, and a detent engageable with a portion of said ratchet mechanism to positively lock said first named means in adjusted position.

11. A device of the type described, comprising a body, supporting means mounted in said body, a rotatable adjusting ring to axially adjust said supporting means relatively to said body, a toothed flange secured to said adjusting ring and engaging with said body to maintain the same against axial movement relative to said adjusting ring, a slot defined by said body to provide for relative movement between said adjusting ring and toothed flange and said body in a direction substantially perpendicular to their axes to assemble the same, a resiliently mounted detent associated with said toothed flange to provide a ratchet for maintaining said adjusting ring in adjusted position, the second detent engageable with said toothed flange for locking said adjusting ring in adjusted position, and means for positively maintaining said second detent in locking relation to said toothed flange.

12. A device of the type described, comprising a body, supporting means mounted in said body, a rotatable adjusting ring to axially adjust said supporting means relatively to said body, a toothed flange secured to said adjusting ring and engaging with said body to maintain the same against axial movement relative to said adjusting ring, a slot defined by said body to provide for relative movement between said adjusting ring and flange and said body in a direction substantially perpendicular to their axes to assemble the same, a resiliently mounted detent associated with said toothed flange to provide a rachet for maintaining said adjusting ring in adjusted position, a bore in said body radially opposite said toothed flange, a freely movable body in said bore for engagement with said toothed flange for locking said adjusting ring in adjusted position, and means slidable on said body over said bore to maintain said freely movable body in positive locking relation to said toothed flange.

JOSEPH F. BUHR.
ROLLO G. ELLIS.